US011951524B2

(12) United States Patent
Janiszewski

(10) Patent No.: US 11,951,524 B2
(45) Date of Patent: Apr. 9, 2024

(54) ADJUSTABLE JOINING MACHINE

(71) Applicant: BTM Company LLC, Marysville, MI (US)

(72) Inventor: Joseph Andrew Janiszewski, Port Huron, MI (US)

(73) Assignee: BTM COMPANY LLC, Marysville, MI (US)

( * ) Notice: Subject to any disclaimer, the term of this patent is extended or adjusted under 35 U.S.C. 154(b) by 559 days.

(21) Appl. No.: 17/002,375

(22) Filed: Aug. 25, 2020

(65) Prior Publication Data

US 2022/0062968 A1 Mar. 3, 2022

(51) Int. Cl.
*B21D 39/03* (2006.01)
*B21D 43/00* (2006.01)
*B21D 43/02* (2006.01)
*B30B 15/00* (2006.01)

(52) U.S. Cl.
CPC ......... *B21D 39/031* (2013.01); *B21D 43/003* (2013.01); *B30B 15/0029* (2013.01); *B30B 15/0035* (2013.01); *B21D 43/023* (2013.01)

(58) Field of Classification Search
CPC .. B21D 39/031; B21D 43/003; B21D 43/023; B30B 15/0029; B30B 15/0035
USPC ......................................................... 72/453.1
See application file for complete search history.

(56) References Cited

U.S. PATENT DOCUMENTS 4,459,735 A 7/1984 Sawdon
4,558,577 A * 12/1985 Trishevsky ............ B21D 5/083 72/181
4,574,453 A 3/1986 Sawdon
4,574,473 A 3/1986 Sawdon
4,691,553 A * 9/1987 Barber ...................... F16P 3/16 192/130
4,722,647 A 2/1988 Sawdon
4,757,609 A 7/1988 Sawdon
4,878,284 A 11/1989 Sawdon
4,910,853 A 3/1990 Sawdon
5,027,503 A 7/1991 Sawdon
5,150,513 A 9/1992 Sawdon
5,177,861 A 1/1993 Sawdon
5,208,973 A 5/1993 Sawdon
5,208,974 A 5/1993 Sawdon et al.
(Continued)

FOREIGN PATENT DOCUMENTS

FR 2539339 * 12/1985
IT 1172732 * 6/1987

OTHER PUBLICATIONS

Hand Held Clinching Units, BTM Company Catalog ID # 735454J, published prior to Aug. 25, 2020, 36 pages.
(Continued)

*Primary Examiner* — Jimmy T Nguyen
*Assistant Examiner* — Smith Oberto Bapthelus
(74) *Attorney, Agent, or Firm* — Harness, Dickey & Pierce PLC

(57) ABSTRACT

An adjustable joining machine is provided. In another aspect, a workpiece-joining apparatus includes a punch and/or die with an automatically adjustable joining position. A further aspect employs a workpiece-clinching or piercing apparatus including an automatically adjustable punch and/or die. A method of clinching or piercing workpiece sheets includes changing a position of a punch and/or die based on a sensed workpiece characteristic.

25 Claims, 14 Drawing Sheets

(56) References Cited

U.S. PATENT DOCUMENTS

| | | | | |
|---|---|---|---|---|
| 5,267,383 | A | 12/1993 | Sawdon | |
| 5,339,509 | A | 8/1994 | Sawdon et al. | |
| 5,431,089 | A | 7/1995 | Sawdon | |
| 5,435,049 | A | 7/1995 | Sawdon | |
| 5,479,687 | A | 1/1996 | Sawdon | |
| 5,581,860 | A | 12/1996 | Sawdon | |
| 5,709,019 | A | 1/1998 | Sawdon | |
| 5,727,302 | A | 3/1998 | Sawdon | |
| 5,737,819 | A | 4/1998 | Sawdon et al. | |
| 5,782,130 | A | 7/1998 | Sawdon | |
| 5,860,315 | A | 1/1999 | Sawdon | |
| 6,018,979 | A * | 2/2000 | Davis | B21D 37/08 72/482.4 |
| 6,092,270 | A | 7/2000 | Sawdon | |
| 6,430,795 | B1 | 8/2002 | Sawdon et al. | |
| 6,757,951 | B2 | 7/2004 | Sawdon et al. | |
| 6,785,959 | B2 | 9/2004 | Sawdon et al. | |
| 7,003,861 | B2 | 2/2006 | Sawdon et al. | |
| 7,694,399 | B2 | 4/2010 | Sawdon et al. | |
| 8,650,730 | B2 | 2/2014 | Sawdon | |
| 8,881,364 | B2 | 11/2014 | Sawdon et al. | |
| 9,421,599 | B2 | 8/2016 | Sawdon et al. | |
| 9,931,720 | B2 | 4/2018 | Sawdon et al. | |
| 10,328,481 | B2 | 6/2019 | Koenigbauer et al. | |
| 2017/0355010 | A1 * | 12/2017 | Janiszewski | B21D 55/00 |

OTHER PUBLICATIONS

Tog-L-Loc® Clinch Tooling, BTM Company catalog, published prior to Aug. 25, 2020, 36 pages.
Tog-L-Loc® Tooling: 940 Series, BTM Company catalog, published prior to Aug. 25, 2020, 32 pages.
Lance-N-Loc® Clinch, BTM Company catalog, published prior to Aug. 25, 2020, 16 pages.
Introduction to Tog-L-Loc®, BTM Company catalog, published prior to Aug. 25, 2020, 24 pages.
Universal Hydraulic Presses for Production & Prototype Applications, BTM Corporation catalog, published prior to Aug. 25, 2020, four pages.
MCP-5 Manual Drive Cylinder Press, BTM Company Catalog ID # 736078A, published prior to Aug. 25, 2020, eight pages.
Joint Metal With Stamping Dies, BTM Company catalog, published prior to Aug. 25, 2020, eight pages.
Thin Air Powered Toggle Presses, BTM Corporation catalog, published prior to Aug. 25, 2020, 39 pages.
Tog-L-Loc® Clinching Machines, sold in Europe by BTM Europe prior to Aug. 25, 2020, two pages.

* cited by examiner

ADJUSTABLE JOINING MACHINE

BACKGROUND AND SUMMARY

The present disclosure relates generally to an adjustable joining machine and more particularly to an adjustable workpiece-clinching or piercing apparatus.

It is well known to employ a punch and die assembly to create a clinch joint within sheet metal workpieces located therebetween. Examples of such conventional devices are disclosed in the following U.S. patents invented by Sawdon which are commonly owned with the present application: U.S. Pat. No. 7,694,399 entitled "Sheet Fastening Apparatus and Method" which issued on Apr. 13, 2010; U.S. Pat. No. 7,003,861 entitled "Tool Assembly Employing a Flexible Retainer" which issued on Feb. 28, 2006; U.S. Pat. No. 6,430,795 entitled "Composite Urethane Stripper for Metal Joining Apparatus" which issued on Aug. 13, 2002; and U.S. Pat. No. 5,581,860 entitled "Apparatus for Joining Sheet Material" which issued on Dec. 10, 1996. All of these patents are incorporated by reference herein. While these traditional devices were significant improvements in the industry, the punches and dies were set at a pre-determined clinching or piercing distance from each other when in a fully advanced position, such that manual replacement of a different length punch or die was required to handle workpieces of differing thicknesses.

In accordance with the present invention, an adjustable joining machine is provided. In another aspect, a workpiece-joining apparatus includes a punch and/or die with an automatically adjustable joining position. A further aspect employs a workpiece-clinching or piercing apparatus including an automatically adjustable punch and/or die. A method of clinching or piercing workpiece sheets includes changing a position of a punch and/or die based on a sensed workpiece characteristic. Another aspect joins garage door workpieces of different thicknesses, between multiple adjacent and adjustable punches and dies.

The present apparatus and method are advantageous over traditional devices. For example, the present apparatus can automatically adjust punch and/or die positions to account for different workpiece thicknesses being fed into the machine. Furthermore, the present design changes punch and/or die joining height positions based on sensed workpiece characteristics, such as thickness. This automatic adjustment allows the same punch and die assembly to be used for multiple workpiece thicknesses without requiring traditional machine shutdown and manual replacement with different height punches and/or dies, such that the present apparatus increases flexibility and efficiency. This is well suited for high volume manufacturing of metallic garage doors. Additional advantages and features of the present apparatus and method can be ascertained from the following description and appended claims, taken in conjunction with the accompanying drawings.

DETAILED DESCRIPTION

Figure 1:
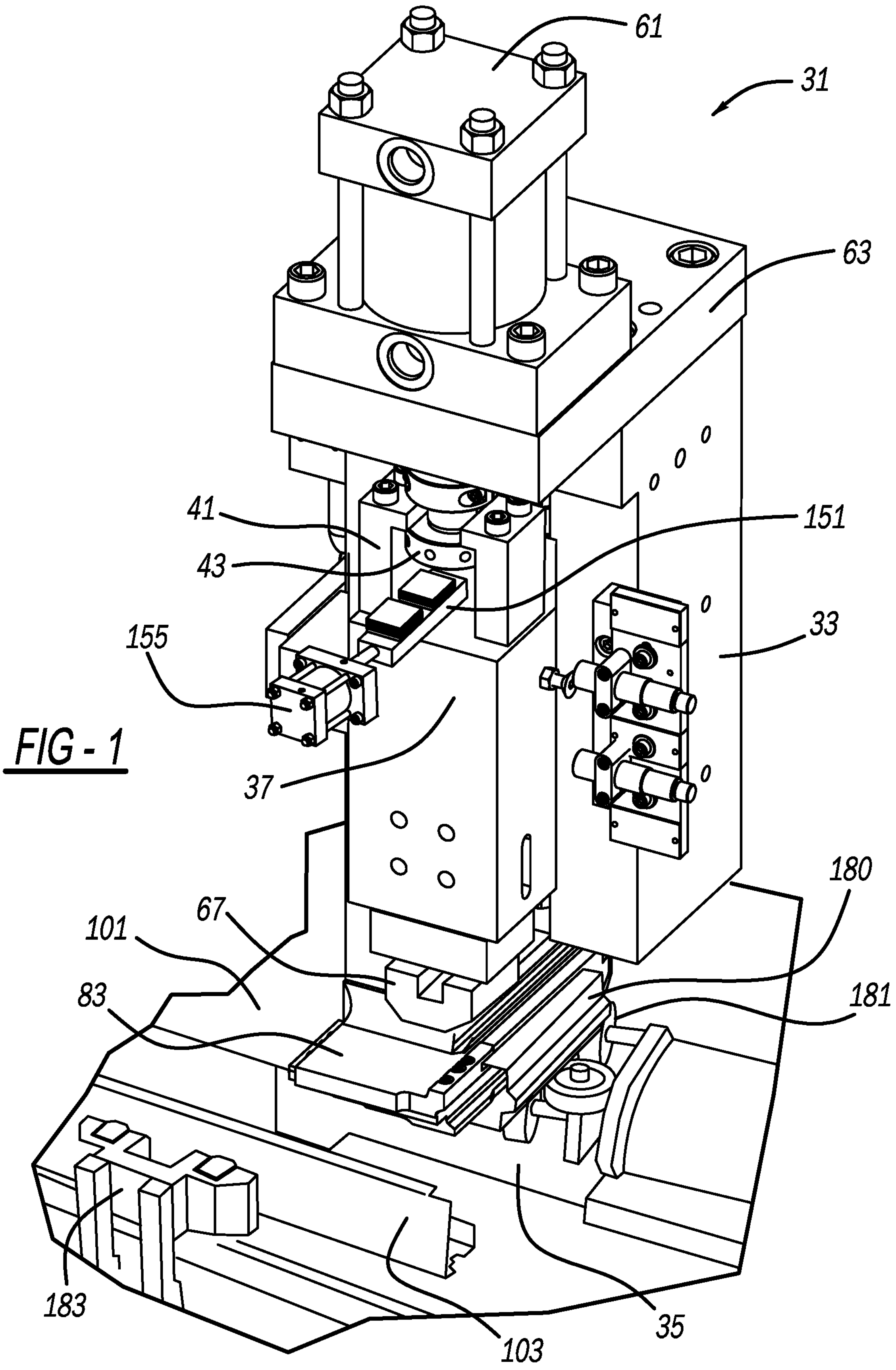
FIGS. 1-5 are a series of perspective views showing the present adjustable joining machine clinching together workpieces.

An adjustable joining apparatus 31 is illustrated in FIGS. 1, 6 and 9-11. Joining apparatus 31 includes a metal-working machine having a stationary frame 33 upstanding from a fixture 35. A tooling guide block 37 is linearly movable and coupled to frame 33 via a carriage and rail assembly 39. A pair of generally inverted L-shaped brackets 41 each have a proximal end screwed to a top of guide block 37, and facing bifurcated distal ends which interlock with an undercut head 43 of a longitudinally elongated press ram 45. A lost motion coupling is present between the distal ends of brackets 41 and head 43 to allow a few millimeters of longitudinal movement of one before the other moves, to provide room for shut height adjustment as will be discussed in greater detail hereinafter.

A primary actuator 61 is mounted on top of frame 33 with an optional overhanging mounting platform 63 therebetween. Primary actuator 61 includes a cylinder within which is a fluid powered piston (see FIG. 11). The primary actuator is preferably hydraulically powered but may alternately be pneumatically powered, a combination of air-over-oil powered, or the like. For example, an air-to-oil actuator of commonly owned U.S. Pat. No. 7,263,831 entitled "Air-To-Oil Intensifying Cylinder" can be used, and is incorporated by reference herein. Press ram 45 is coupled to the piston through a coaxial piston rod, and the ram is thereby longitudinally advanced and retracted due to actuation of the primary actuator.

At least one, and preferably three, longitudinally elongated and parallel punches 65 are attached within guide block 37, with an optional punch holder and/or lateral fastener. A laterally enlarged stripper 67, with chamfered lower corners, contains apertures which each surround a side adjacent a distal end of each of the multiple punches 65; the stripper and punches are simultaneously linearly advanced and retracted by activation of primary actuator 61 in the longitudinal direction. Compression springs 69 surround middle sections of punches 65 to bias stripper 67 away from guide block 37.

Figure 12:
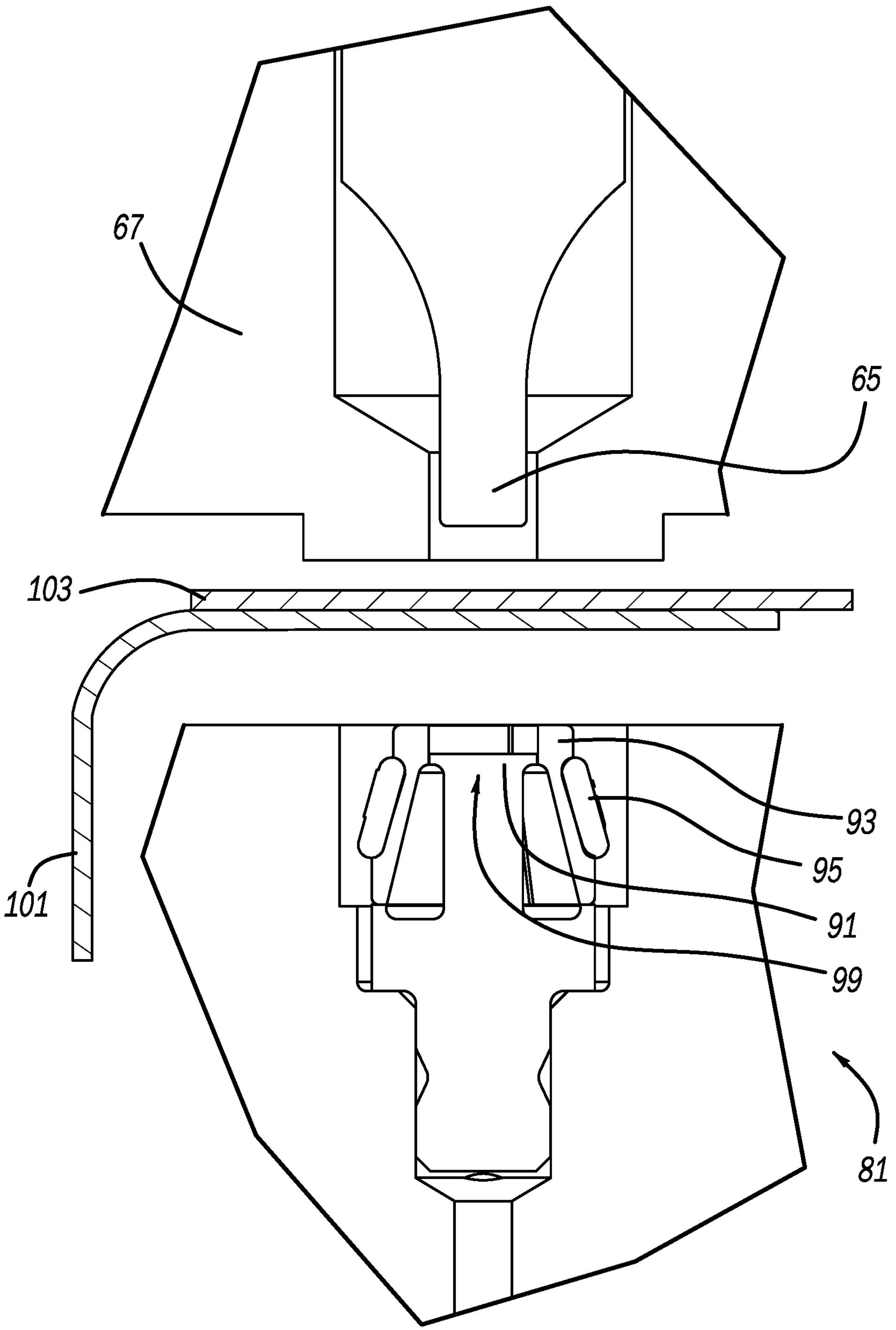
FIG. 12 is an enlarged cross-sectional view showing a punch and a die of the present adjustable joining machine, before forming a clinch joint.

At least one and more preferably three dies 81 are attached in a co-planar and parallel, yet spaced apart arrangement within a die holder 83, which is adjacent to a bottom end of frame 33. Each die 81 preferably includes a central anvil 91, laterally surrounded by three upstanding die blades 93, as can be observed in FIG. 12. An elastomeric and flexible biasing ring 95 or a canted coiled spring surrounds die blades 93 and biases them toward anvil 91. Anvil 91 has a generally flat, workpiece-contacting upper surface and a circular surrounding lateral surface with an annular groove 175 for receiving enlarged portions of the die blades therein.

Figure 15:
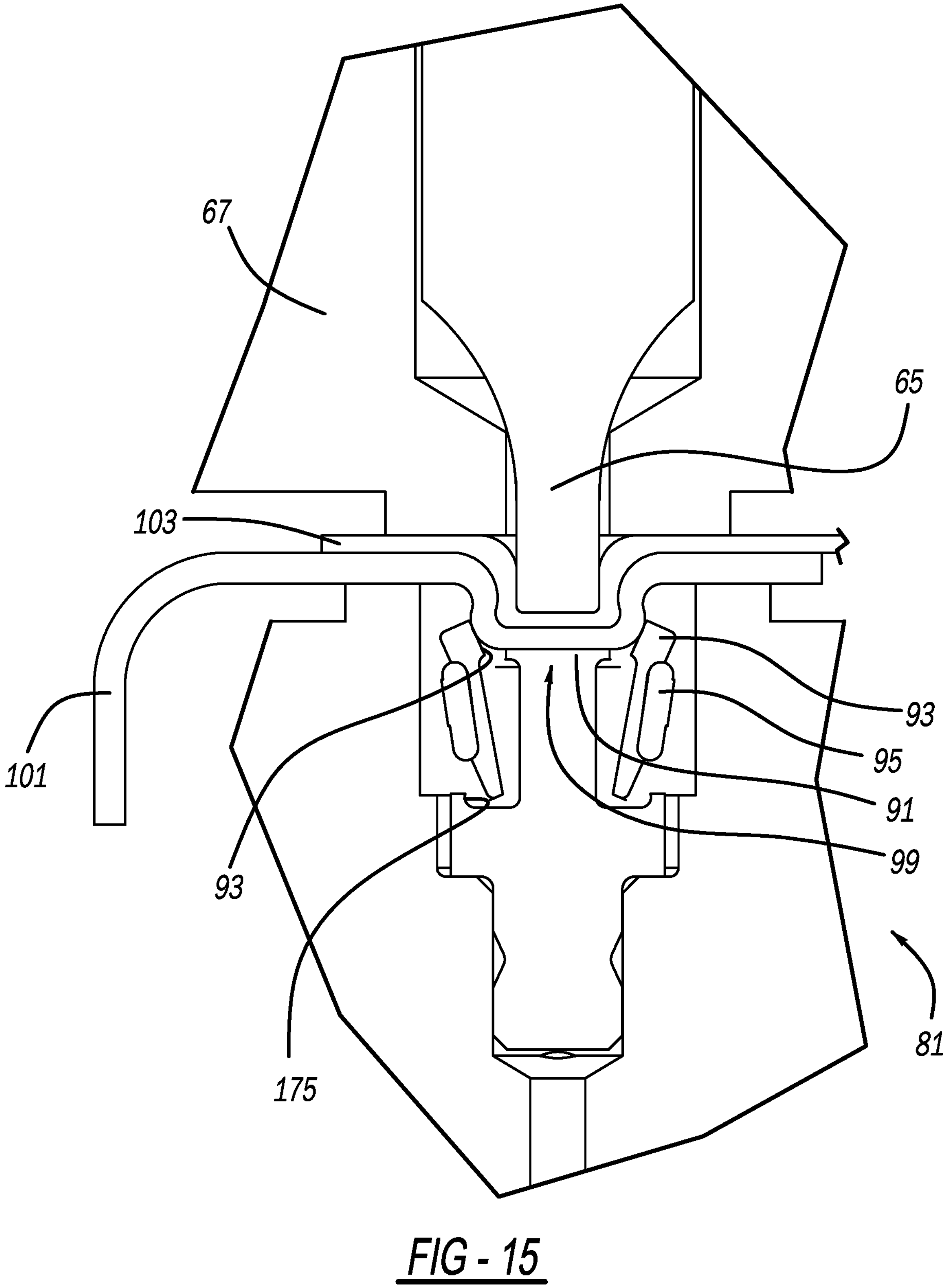
FIG. 15 is an enlarged cross-sectional view showing a punch and a die of the present adjustable joining machine, forming a clinch joint.

A metal-working, leading end of each punch 65 is coaxially aligned with an centerline of an associated elongated anvil 91. Clinch joints 99 (see FIGS. 5, 12 and 15) are created by deformation of sheet metal workpieces 101 and 103 between punches 65 and dies 81. Clinching interlocks together the workpieces in an interlocking fashion with a generally circular expanded button located closest to the anvil and a cylindrically depressed cup shape on the punch side. The clinch joint is preferably leak-proof and does not employ a separate fastener such as a rivet. During clinching, the lateral and outward expansion of the workpieces between the punches and anvils cause the die blades to outwardly move away from the lateral side surface of each anvil while compressing the retainer ring against either a die shield or an internal bore of the die holder. After the clinching joint is formed, the punch is retracted by the primary actuator, the joined workpieces are removed from die, and the retainer ring will urge the die blades back together again against each anvil.

Referring to FIGS. 3, 4 and 6-8, an adjustment slide 151, also known as a movable adjuster, is linearly moveable in a lateral direction substantially perpendicular to the advancing longitudinal direction of punches 65. A secondary actuator 153 is mounted to guide block 37, and is connected to slide 151 via an alignment rod coupler 156, which allows some relative rotational movement to compensate for any connection misalignment. Secondary actuator 155 preferably includes a fluid-powered piston and rod, such as pneumatically powered, if two movement positions are desired. A pair of coupled pneumatic actuators can be used if three movement positions are desired, however, a servo motor actuator may be employed if movement between more than three positions is desired for the adjustment slide.

Adjustment slide 151 preferably includes at least two spacers or steps 157 and 159 of differing thickness and heights. For example, a thickness $T_A$ of step 157 is less than a thickness $T_B$ of step 159 relative to an opposite bottom surface of slide 151. This thickness difference of the steps serves to provide discrete adjustment shims or buttresses between a distal end of press ram 45 and the facing top surface of guide block 37. In other words, adjustment step 157 or 159 is moved between primary actuator 61 and ram 45 on one side, and guide block 37 and punches 65 on the other side. Secondary actuator 155 automatically moves the desired thickness step into the abutment position which causes the shut height or joining advanced position distance $T_A$ and $T_B$ of the punches relative to the dies to change and differ (compare FIG. 7 to FIG. 8) depending on a workpiece characteristic, such as thickness or alternately material type. Thus, the shut height is adjusted and varied by the same thickness of the step inserted which correlates to the total workpiece thickness $T_A$ or $T_B$, or even different yet if all of the steps are retracted for a third total workpiece thickness.

A thickness characteristic of one or both workpieces is sensed by a sensor 171 the output of which is sent to a programmable controller 173. Controller 173 automatically compares the sensed value to a set of stored values and then determines the desired shut height thereby causing the secondary actuator to move the slide to the appropriate location. The sensor is preferably a bar-code reader 171 associated with a coil of sheet metal but may alternately be an optical, electrical or force sensor when the workpieces are initial fed into the machine but before the joining cycle commences. The secondary actuator may change slide abutment positions between each joining cycle during punch retraction or after the punch is retracted but before the next punch advancement occurs.

Figure 14:
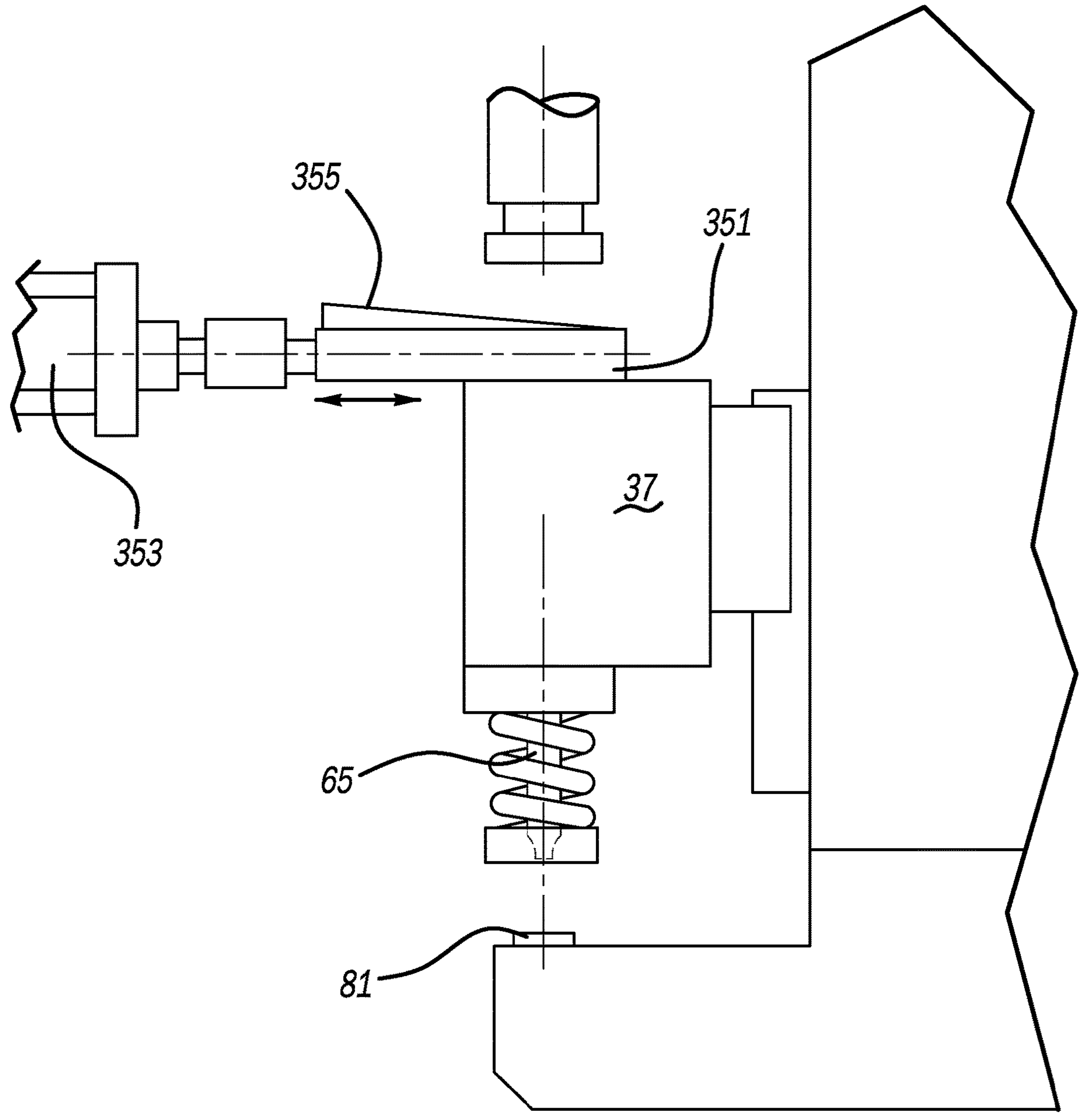
FIG. 14 is a diagrammatic side view showing an alternate embodiment of a portion of the present adjustable joining machine.

In the alternate embodiment illustrated in FIG. 14, an adjustment slide 351, also known as a movable adjuster, is automatically moveable by an actuator 353. In this example, a wedge 355 has a tapered upper surface facing press ram 45. A flat bottom surface of slide 351 contacts guide block 37 to move punches 65 as with the embodiment discussed hereinabove. The wedge configuration advantageously allows infinite adjustment of the punch shut height. This infinite adjustability is helpful for different workpiece material thicknesses and also to account for punch or anvil wear over time. Actuator 353 is preferably a servo motor or other electromagnetic device to provide more than three positions for the slide.

The present adjustment apparatus is ideally suited for fastening together sheet steel components of a garage door. As can be observed in FIG. 5, reinforcements or stiles 103 are locally clinched to turned edge flanges of an enlarged garage door pan or panel 101. Panels 101 typically have nonlimiting steel thicknesses of 0.17, 0.22 and 0.32 gauge while stiles 103 typically have nonlimiting steel thicknesses of 0.33, 0.44 and 0.55 gauge. Alternate thicknesses may be used and alternate materials may be used, such as aluminum, copper, brass and the like, for either component.

Figure 2:
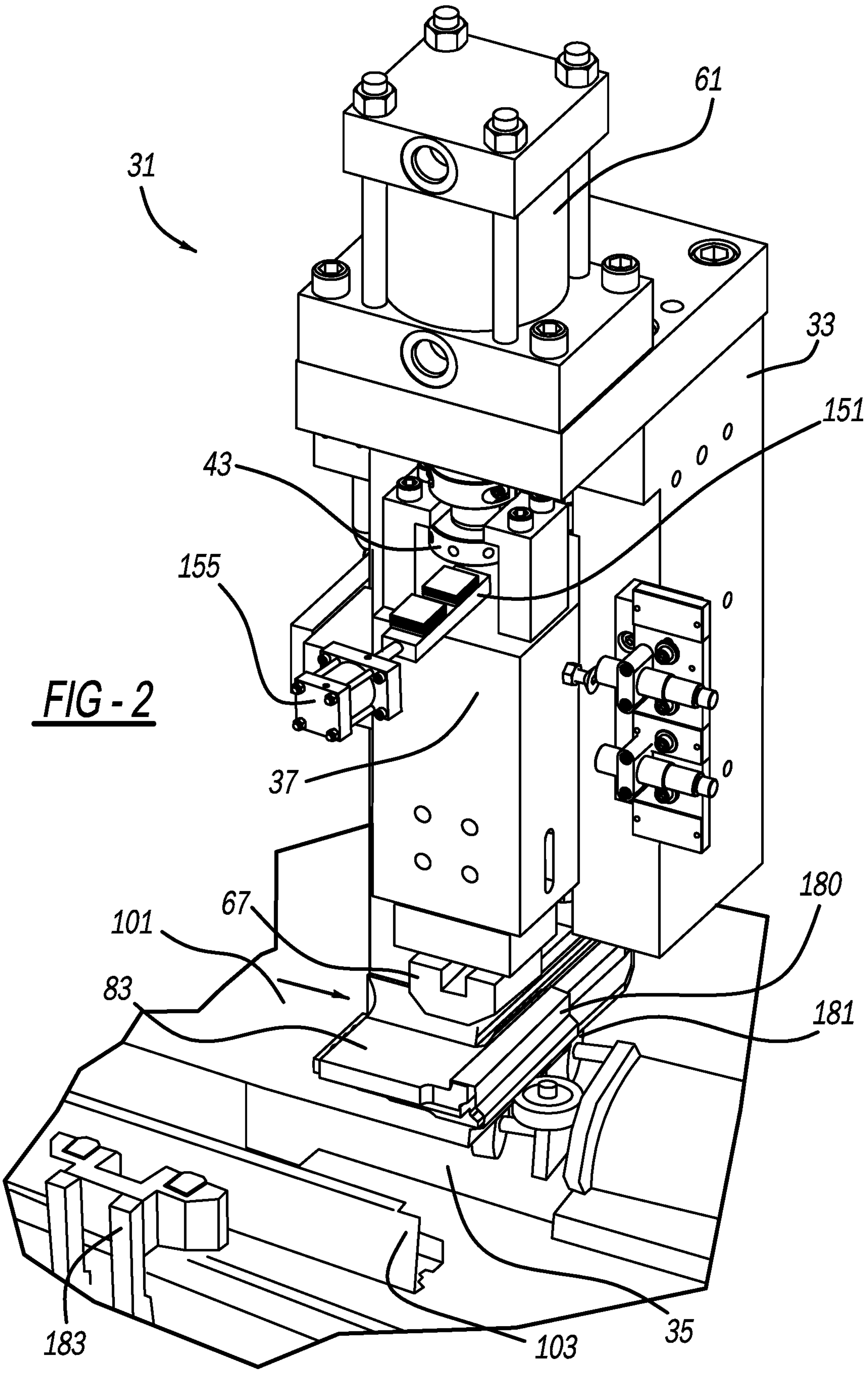

The manufacturing steps within the present adjustable joining machine will now be described. FIGS. 1 and 2 shows garage door panel 101 placed on top of fixture 35 with an upwardly and inwardly bent edge flange 180 held in place by upper, lower and side rollers 181. Guide block 37 and the associated carriage and rail assembly 39 (see FIG. 6) longitudinally lower die holder 83, and then frame 33 laterally slides die holder 83 to position dies 81 (see FIG. 11) below the top inwardly turned portion of edge flange 180. This same machine structure and function is simultaneously occurring in mirrored image on the opposite side of the garage door panel.

Figure 3:
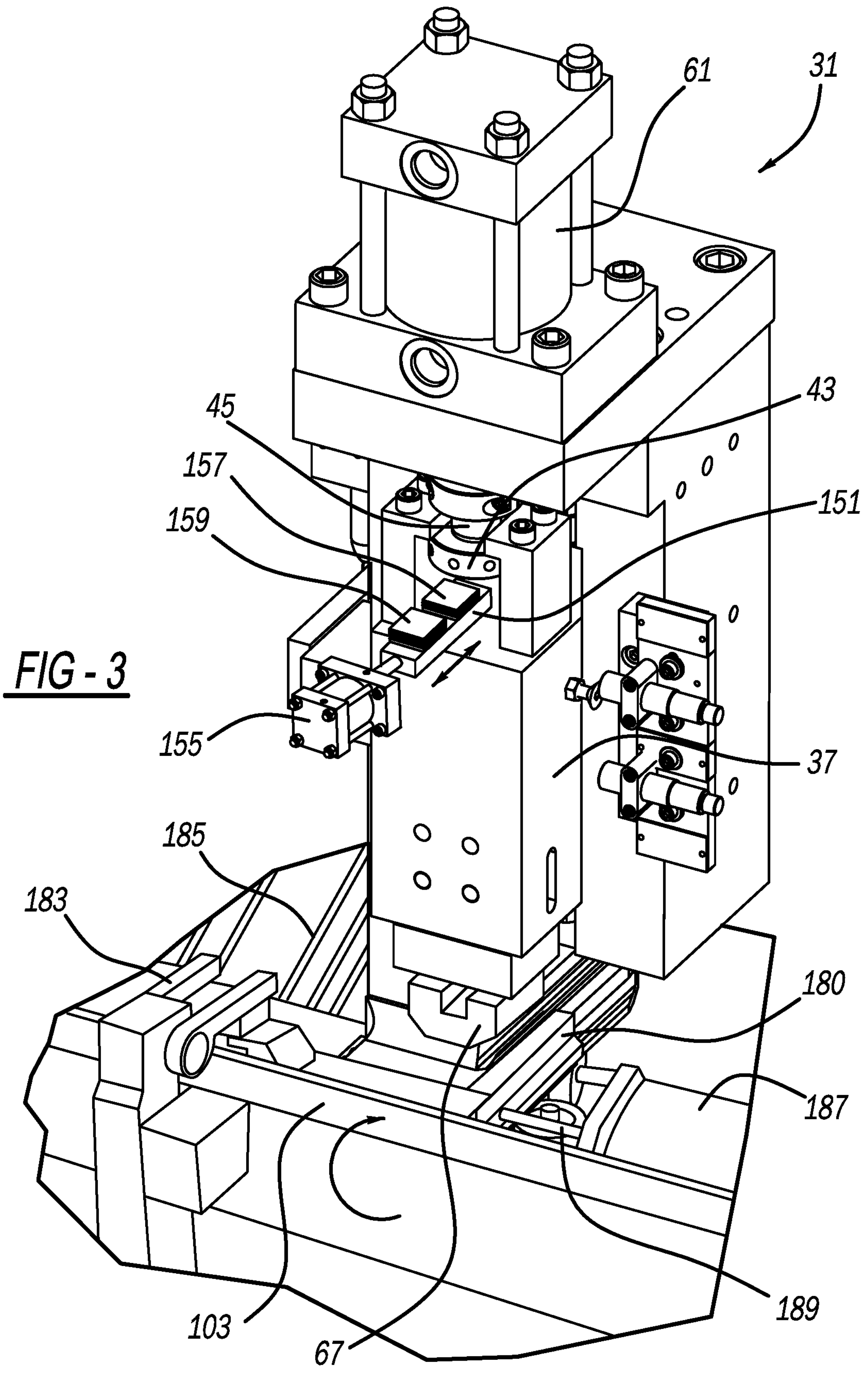

FIG. 3 shows the next operation where fluid powered arms 183 automatically rotate and then clamp stile 103 on top of flange 180 of the garage door panel. Supplemental and optional clamps 185 secure the underside of stile 103 and/or the adjacent central area of the garage door panel in the desired position. Also, a fluid-powered actuator 187 automatically extends a locating pin 189 against a side of flange 180. The punch and stripper 67 are still in their raised positions at this point.

Figure 4:
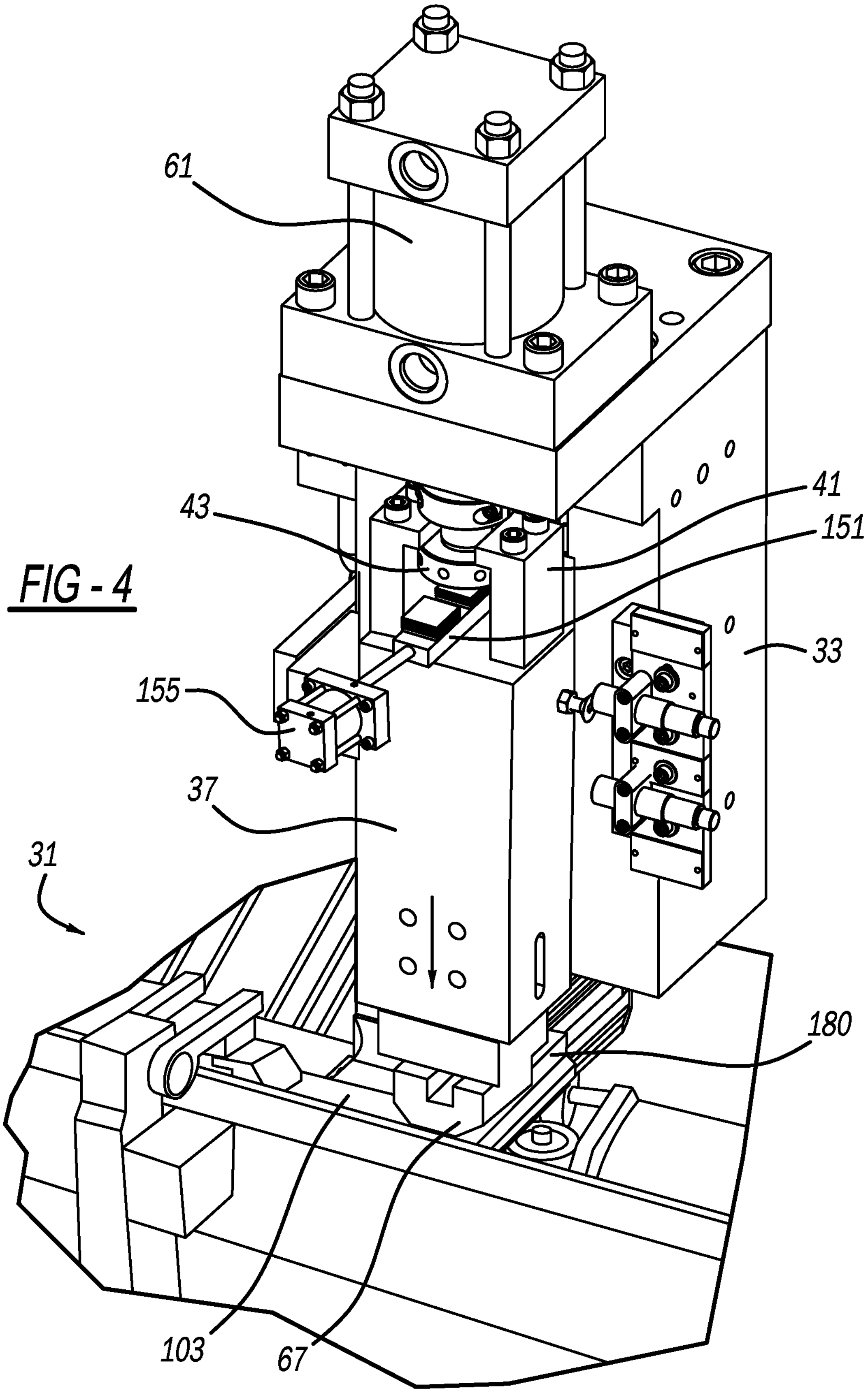
Figure 7:
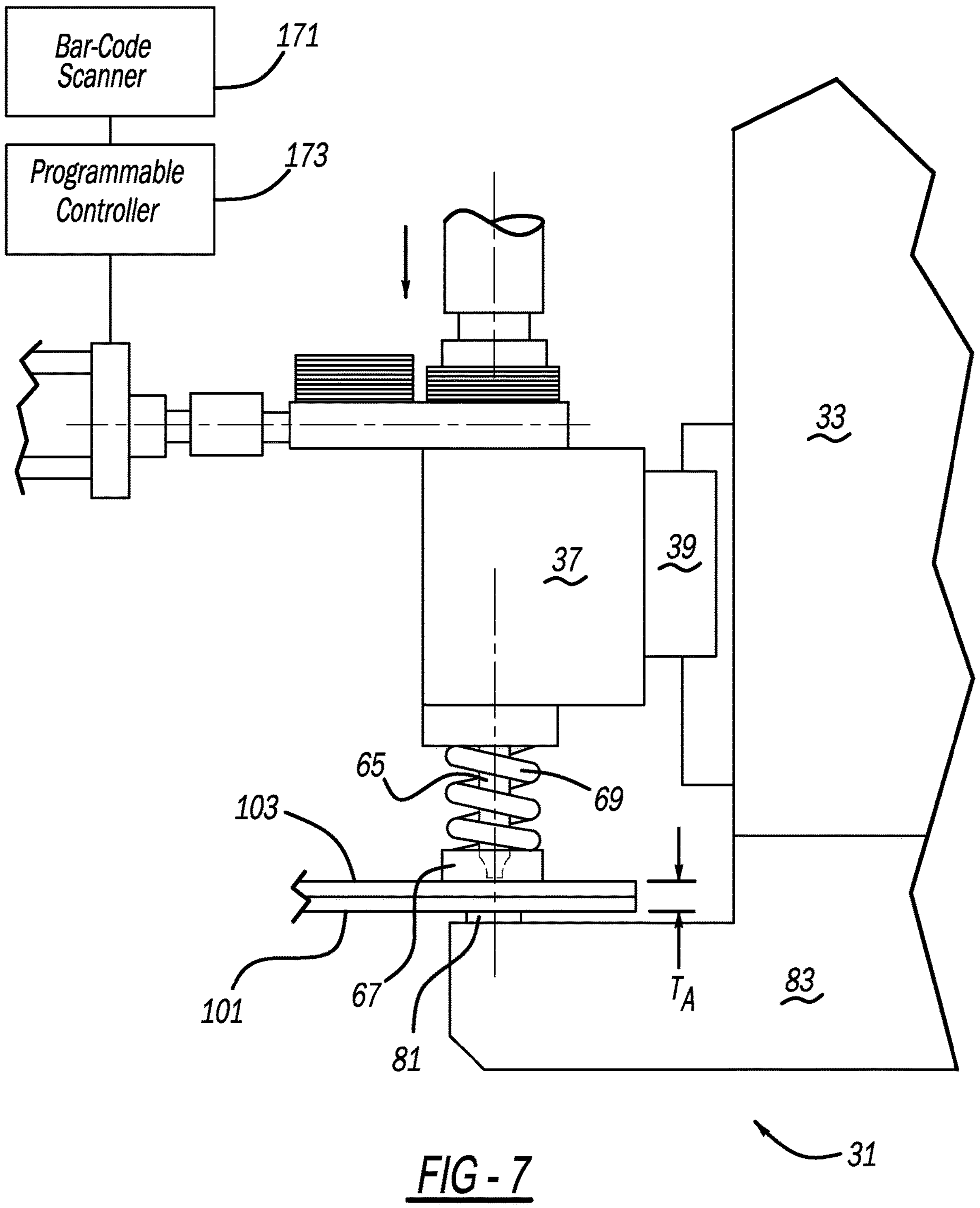
FIGS. 7 and 8 are diagrammatic side views showing the present adjustable joining machine in different advanced positions.
Figure 8:
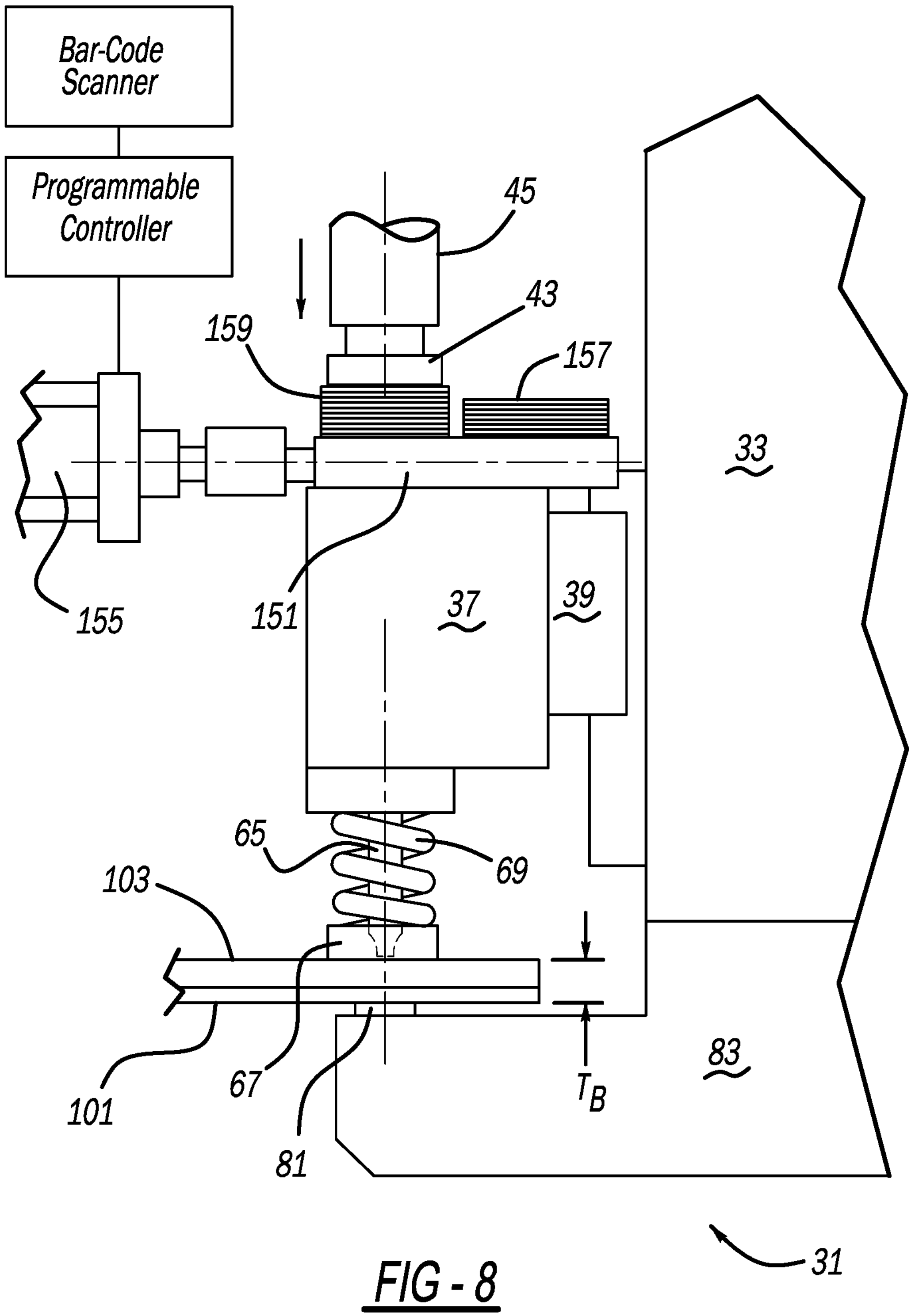
Figure 9:
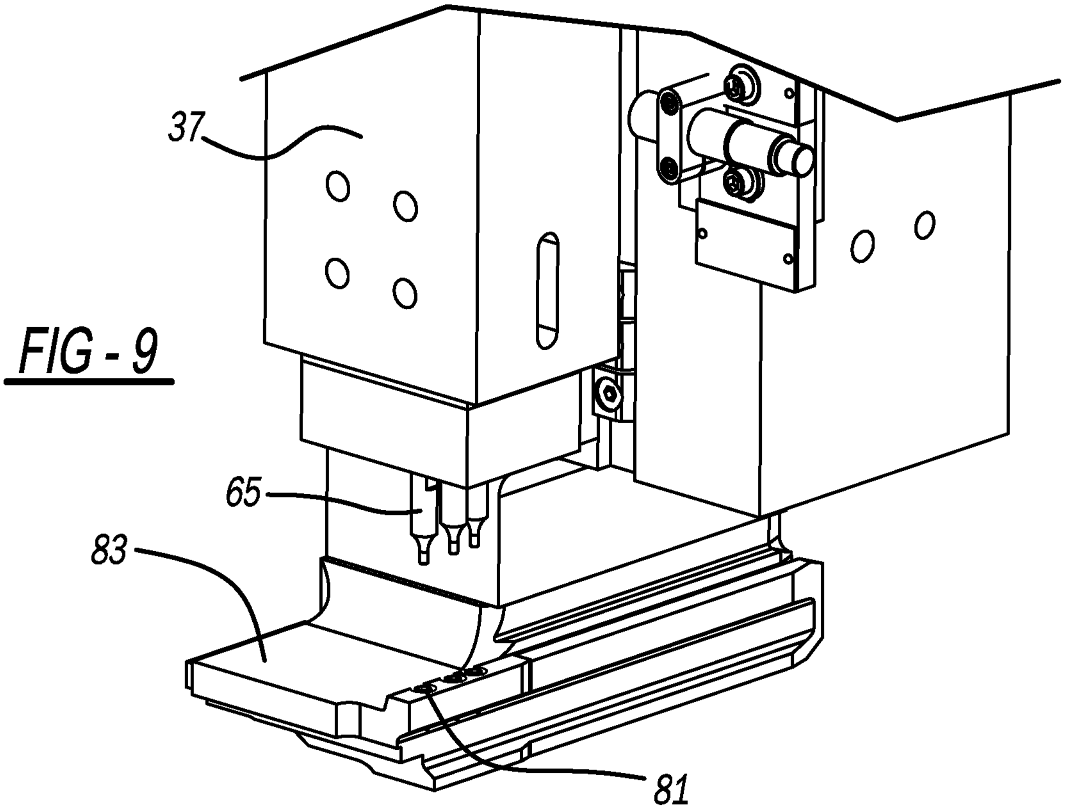
FIG. 9 is a fragmentary and perspective view showing the present adjustable joining machine, in the retracted position and with a stripper removed.
Figure 10:
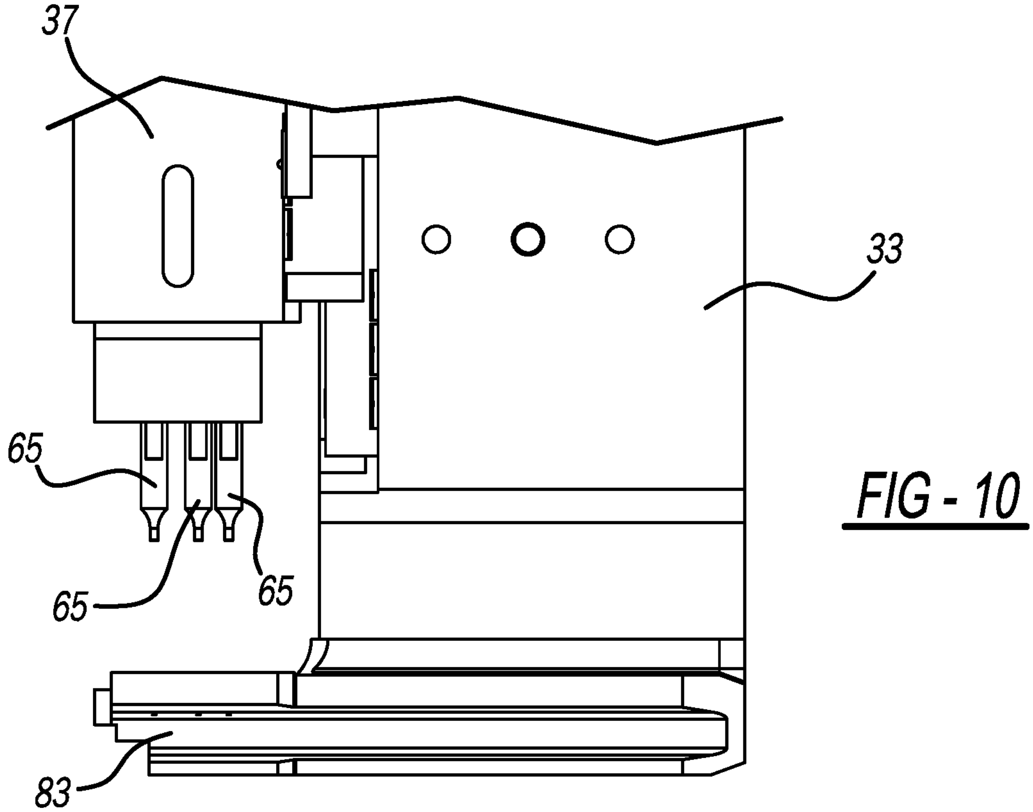
FIG. 10 is a fragmentary and side elevation view showing the present adjustable joining machine, in the retracted position and with the stripper removed.
Figure 11:
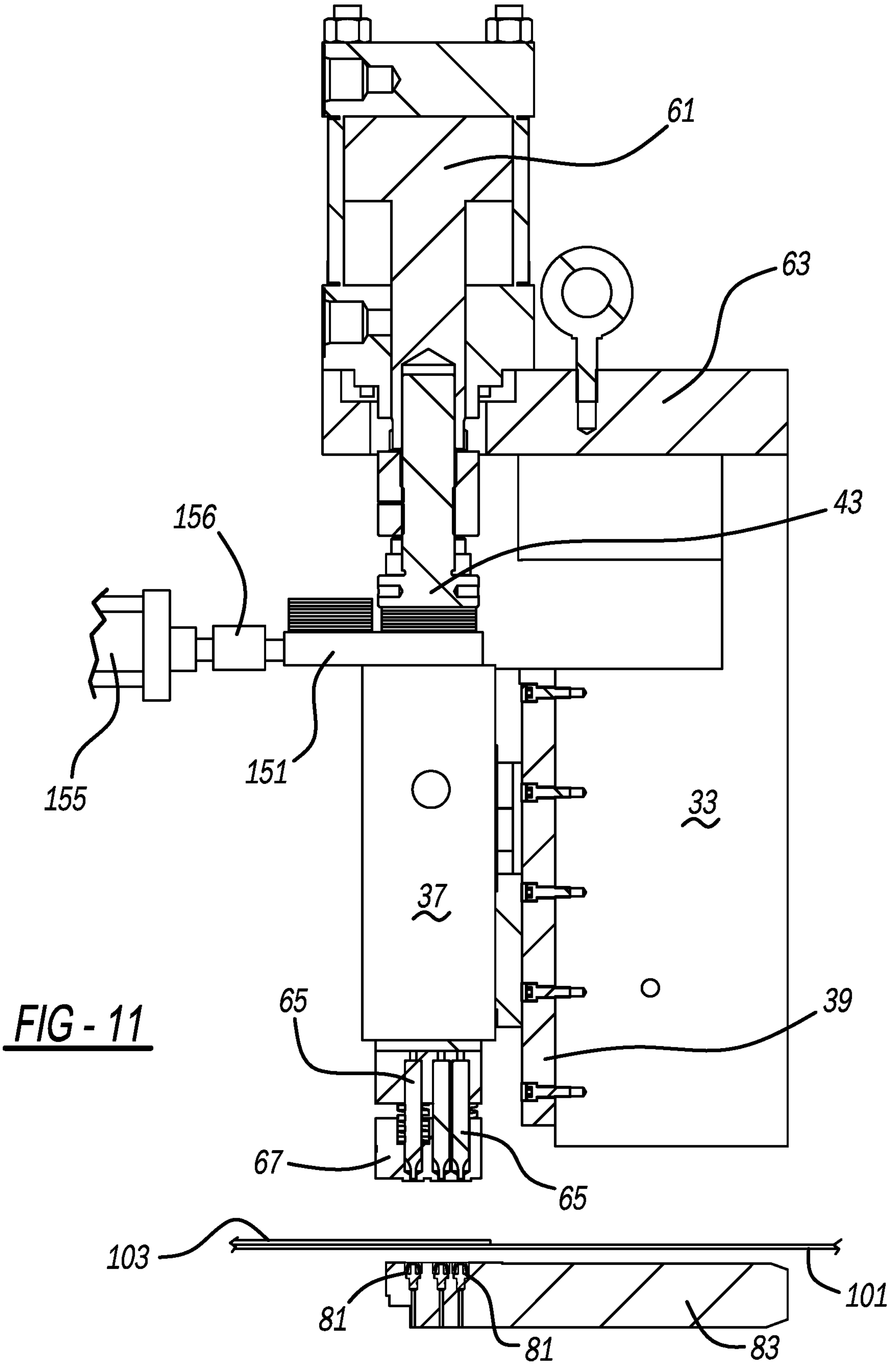
FIG. 11 is a cross-sectional view showing the adjustable joining machine in the retracted position.

Temporally during the conditions of FIGS. 1-3, supplemental actuator 155 linearly moves adjustment slide 151 relative to the longitudinal axis of the punch to locate the desired shut height step 157 or 159. This automatically controlled adjuster action can be observed by comparing FIG. 3 for a first shut height condition (no step inserted), to FIG. 4 for a second shut height condition (with thickest step 159 inserted), to FIGS. 4 and 7 for a third shut height condition (with thinner step 157 inserted). Again, in the preferred example, slide 151 and the desired step 157 or 159, are slid between a distal bottom end of press ram and the facing proximal upper surface of guide block 37. As is illustrated in FIGS. 4, 7 and 8, advancing movement of the piston within primary actuator 61, longitudinally pushes ram 45 against an adjustment step which pushes the opposite bottom surface of slide 151, which in turn, downwardly pushes slide block 37 which advances punch to its furthest advanced shut and clinching position. In this condition, stripper 67 compresses springs 69 and is also moved to clamp against a punch-side surface of stile workpiece 103. The punches and dies act to deform and interlock the workpieces together by creating the three co-planar and spaced apart clinch joints therebetween.

Figure 5:
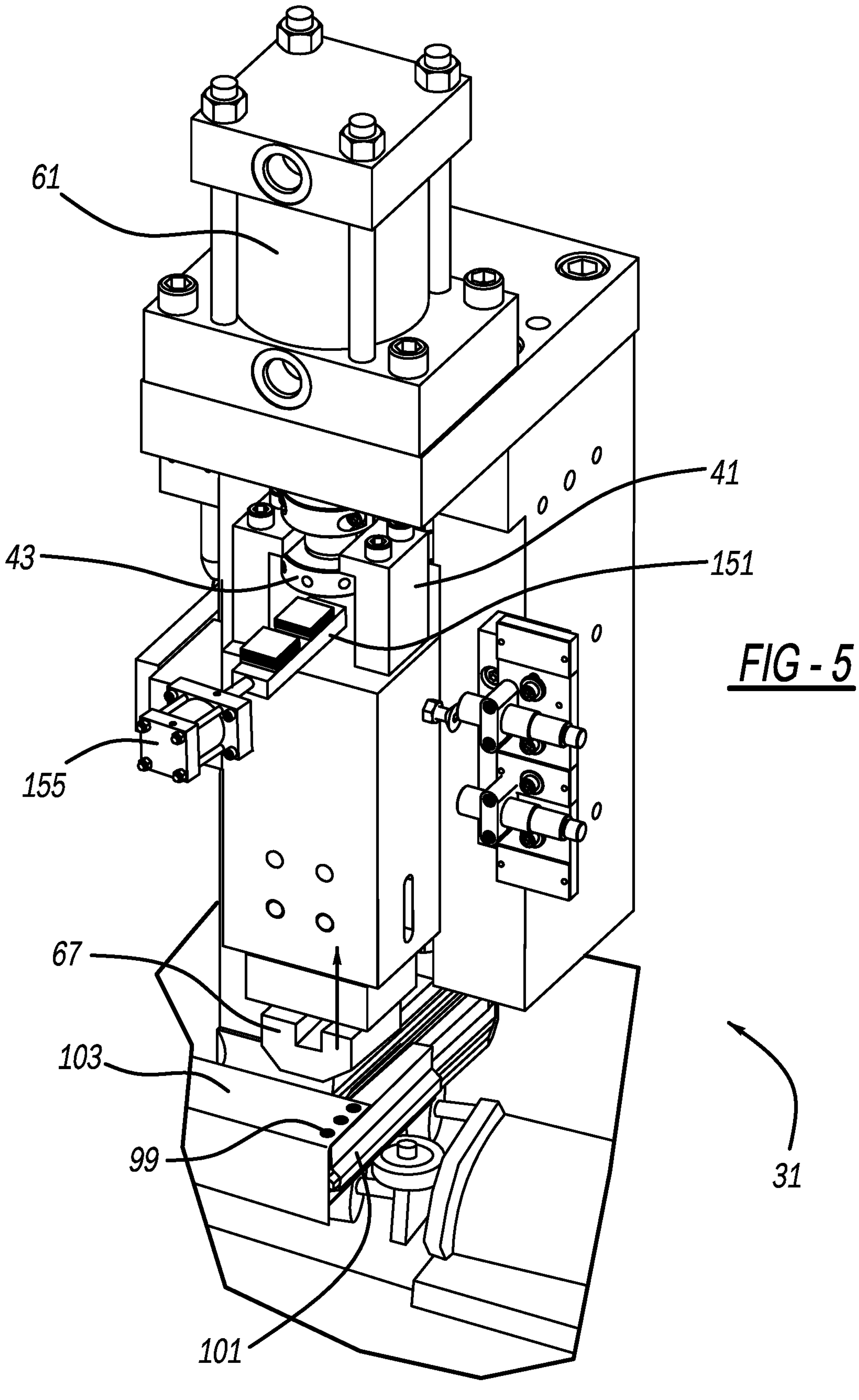
Figure 6:
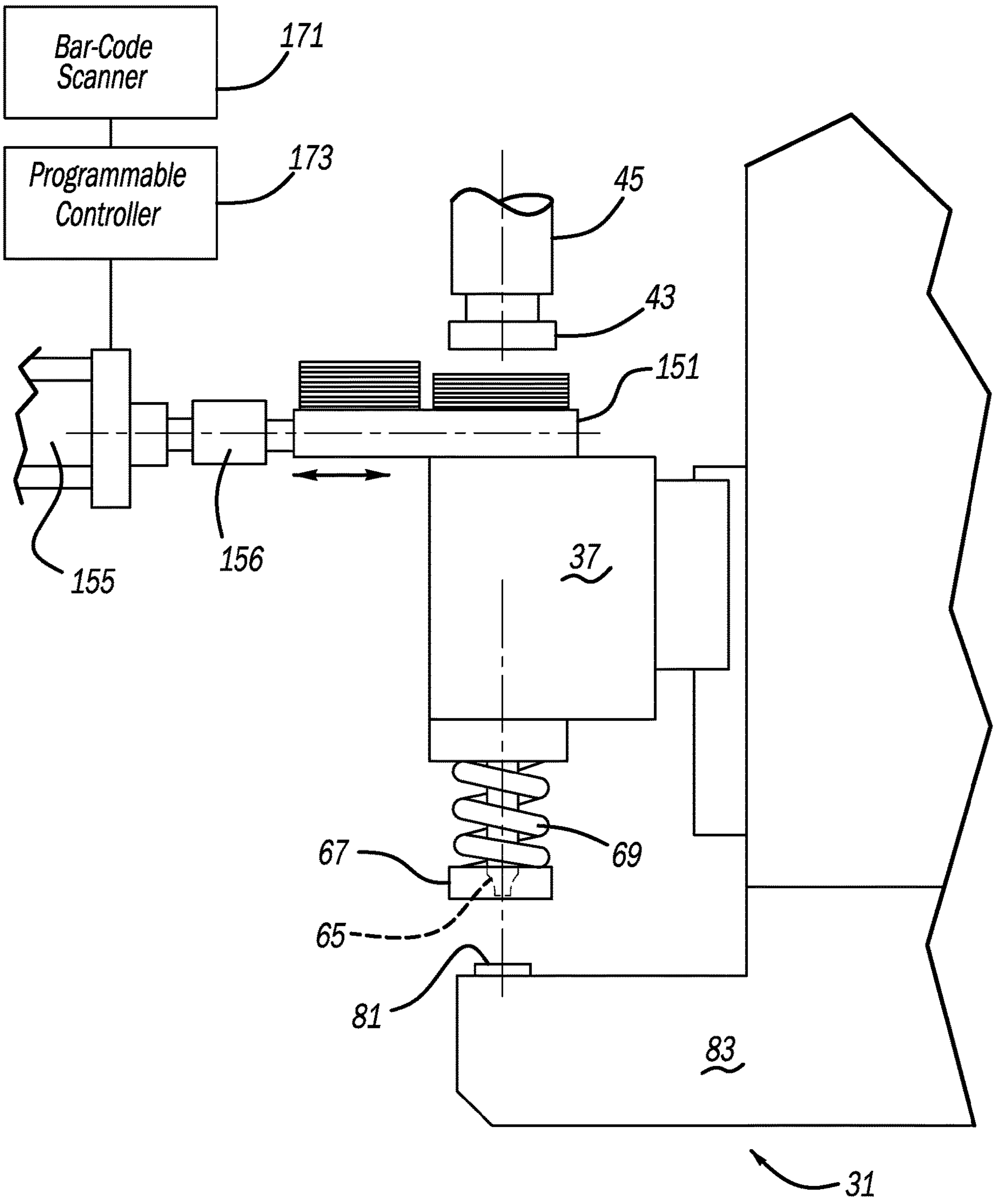
FIG. 6 is a diagrammatic side view showing the present adjustable joining machine in a retracted position.

Thereafter, FIG. 5 shows guide block 37, the punch and stripper 67 retracted after the clinch joints 99 have been created. The fastened stile and garage door panel assembly is removed after the dies have been withdrawn and the clamps and locater pins retracted. The sensor and controller then determine the thickness characteristic of the next stile and/or garage door panel to be fed into the machine, and the controller causes the supplemental actuator to move the slide accordingly to vary the punch-to-die shut height, if needed.

Figure 13:
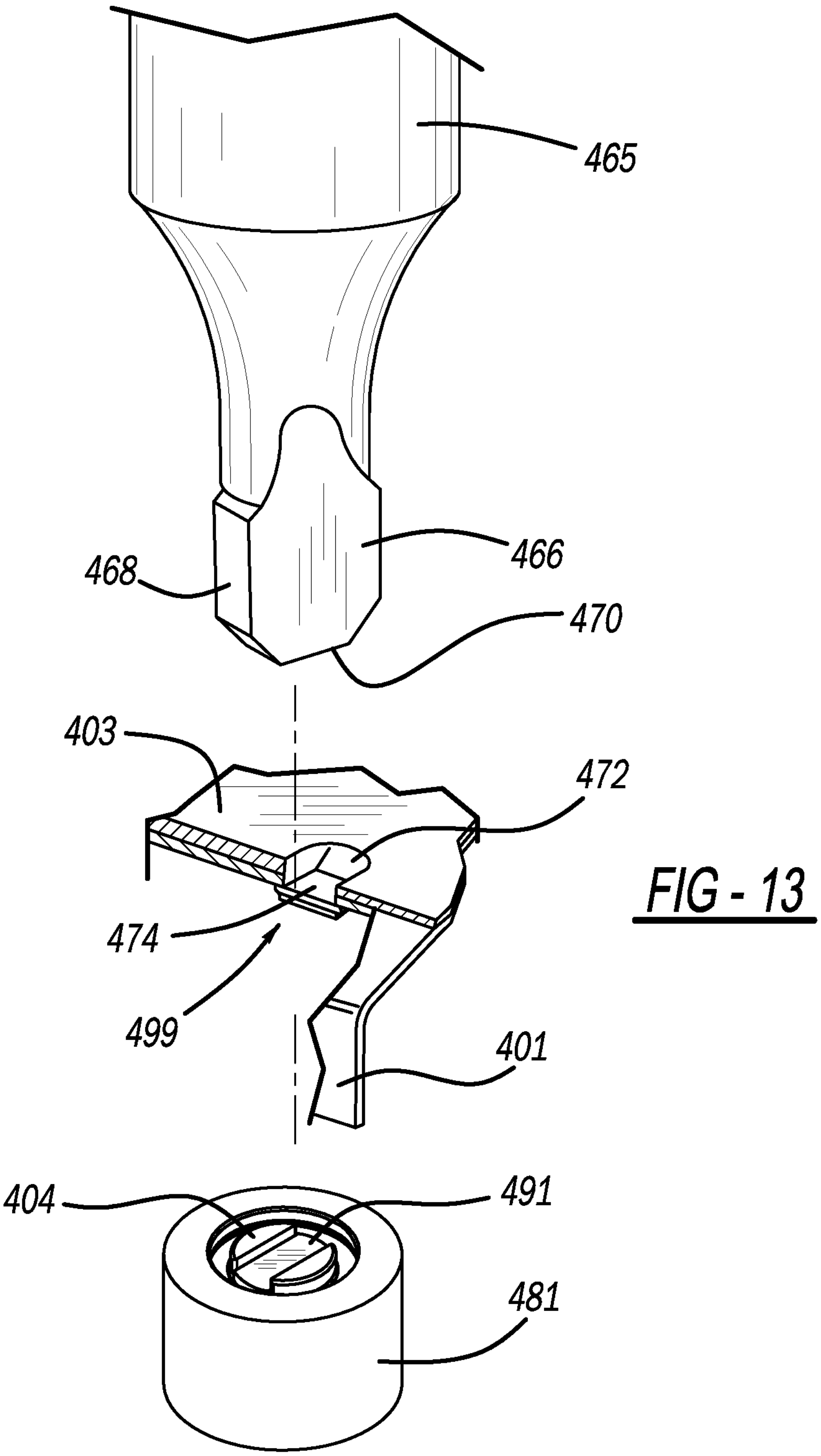
FIG. 13 is an exploded and perspective view showing an alternate embodiment of a portion of the present adjustable joining machine.

Reference is now made to FIG. 13. This embodiment of the present joining apparatus is essentially the same as all of the prior ones. Notwithstanding, a die 481 and punch 465 are different in that a lanced or partially pierced joint 499 is formed between workpieces 401 and 403, and then the pierced edges are outwardly or laterally expanded after the partial piercing so as to overlap the pierced workpiece opening. Two die blades 404 are employed on either side of a laterally elongated anvil 491 which has flat lateral sides adjacent the die blades and curved ends spanning therebetween. A flexible elastomeric ring or a coiled spring is employed to bias the die blades toward the anvil and allow for outward expansion thereof during joint forming.

Punch 465 has flat and/or slightly tapered lateral sides 466, and a thinner width edge 468 therebetween, adjacent a flat leading end 460. Tapered punch corners connect between edges 468 and end 460. The interaction of the punch, anvil and die blades deform the workpieces to create joint 499 having ramps 472 extending from the nominal surfaces and a cup-like offset bottom 474 spanning between the ramps, in one lateral direction, but severs the cup in the other lateral direction bordering the joint bottom. Also, the punch compressing against the anvil laterally expands an uppermost of the bottom cup beyond the severed edges. Thus, no extra fastener is employed, in contrast to riveting, and no heating is employed, in contrast to welding.

While various embodiments have been disclosed, it should be appreciated that other variations are possible. For example, a different quantity of die blades may be employed although certain benefits may not be realized. Furthermore, the ring or spring biasing component may be differently configured although some of the advantages of the present components may not be obtained. It is alternately envisioned that the present apparatus can be used with differently shaped clinch joints and tooling, for punching holes, for inserting different length rivets, for inserting clinch nuts, for inserting clinch studs, for deforming the workpieces such as through tab bending, and the like; however, some of the present clinch joining and lance joining benefits may not be achieved. The present apparatus can be used to join sheet metal workpieces in microwave ovens, clothes washers and driers, dish washers, refrigerators and the like. It is alternately envisioned that the shut height adjuster may linearly or rotationally insert the aforementioned slide or other abutment structure through linkages, cams, slotted tracks or other movement mechanisms, or at other points in the machine such as between the actuator and the ram, between the guide block and the punch, between the dies and the die holder, or the like; however, the advantages of the preferred construction may not be obtained. Moreover, more or less punches and die can be employed. Each of the components disclosed herein may have different shapes or materials but certain benefits may not be achieved. It should also be appreciated that the terms "top," "bottom," "upper," "lower" and other such phrases are merely relative terms which may vary if the parts are inverted or differently oriented. The method steps may be performed in any order or even simultaneously for some operations. The features of any embodiment may be interchanged with any of the other embodiments, and the claims may be multiply dependent in any combination. Variations are not to be regarded as a departure from the present disclosure, and all such modifications are intended to be included within the scope and spirit of the present invention.

The invention claimed is:

1. A workpiece-contacting apparatus comprising:

(a) a die including a workpiece-contacting surface;

(b) a longitudinally elongated punch coaxially aligned with the die;

(c) a longitudinally elongated ram;

(d) a primary actuator operably moving ram, which in turn, drives the punch from a retracted position to a fully advanced position;

(e) a movable adjuster configured to move between the ram and the punch, the adjuster having a smaller longitudinal thickness than a longitudinal length of the punch and a longitudinal length of the ram; and (f) a secondary actuator moving the adjuster, between the primary actuator and the punch, to automatically change a shut height between the fully advanced position of the punch and the workpiece-contacting surface of the die;

(g) wherein the adjuster comprises:

(i) a linear slide;

(ii) a first spacer extending from the slide with a first height;

(iii) at least a second spacer extending from the slide with a second height, the first height being greater than the second height;

(iv) the spacers being laterally offset from each other;

(v) the secondary actuator positioning the adjuster so that only one of the spacers is aligned with the punch during advancing movement of the punch; and (vi) one of the spacers is always aligned with the ram.

2. The apparatus of claim 1, wherein the die comprises:

a central anvil extending in a longitudinal direction and including the workpiece-contacting surface at a distal end thereof;

a die body enlarged in a lateral direction, the anvil extending from the die body;

multiple die blades located adjacent to lateral surfaces of the anvil and operably moveable relative to the anvil;

the adjuster is linearly moveable in a direction perpendicular to the longitudinal direction of the anvil; and the direction of movement of the adjuster is toward a stationary frame, which holds the die and the primary actuator, in an operating condition.

3. The apparatus of claim 1, wherein the ram is linearly moving toward and away from the die due to actuation of the primary actuator, the adjuster being movable between the ram and the punch so as to vary a distance between the ram and the punch temporally between advancing cycles of the punch, and the punch and the die being configured to join together workpiece sheets through deformation.

4. The apparatus of claim 1, further comprising:

a stationary frame;

a guide block to which the punch is mounted, the guide block and the punch always moving together;

a linear carriage and rail assembly moveably coupling the guide block to the frame;

the die being movable toward and away from the frame;

the primary actuator including a fluid-powered piston, and the adjuster being located between the punch and the primary actuator in at least one operating condition; and the punch being located between the adjuster and the die.

5. The apparatus of claim 1, further comprising:

at least a second punch and at least a second die, all of the punches being elongated parallel to each other;

the adjuster operably changing a fully advanced distance between all of the punches and the dies at the same time; and the punches and the dies being configured to join together workpieces.

6. The apparatus of claim 1, further comprising:

a programmable controller electrically connected to the secondary actuator to automatically control a position of the adjuster due to different workpiece thicknesses which, in turn, changes an advanced location of a workpiece-contacting end of the punch; and the punch and the die operably cycling at least 500 times per hour to clinch together or pierce workpieces in each cycle.

7. The apparatus of claim 1, further comprising:

a sensor;

a programmable controller electrically connected to the sensor;

the controller being electrically connected to the secondary actuator to automatically control a position of the adjuster based at least in part on a sensed thickness characteristic of a workpiece.

8. The apparatus of claim 1, further comprising a garage door stile and a garage door sheet metal panel, the punch and the die clinching the stile to turned edge flanges of the panel.

9. A workpiece-contacting apparatus comprising:

(a) a workpiece-joining die including an anvil and upstanding die blades adjacent lateral sides of the anvil, the anvil having a workpiece-contacting surface;

(b) an elongated workpiece-joining punch coaxially aligned with the die;

(c) a fluid-powered actuator operably moving the punch from a retracted position to a workpiece-joining position; and (d) a movable adjuster; and (e) a secondary actuator moving the adjuster to vary a fully advanced distance between the workpiece-joining position of the punch and the workpiece-contacting surface of the die between joining cycles of the apparatus;

(f) a sensor;

(g) a programmable controller electrically connected to the sensor;

(h) the controller being electrically connected to the secondary actuator to automatically control a position of the adjuster based at least in part on a sensed workpiece thickness characteristic and a desired longitudinal shut height of the punch;

(i) wherein the adjuster comprises:

a linear slide;

a first spacer extending from the slide with a first height;

at least a second spacer extending from the slide with a second height, the first height being greater than the second height; and the spacers being laterally offset from each other.

10. The apparatus of claim 9, wherein the adjuster is linearly moveable in a lateral direction perpendicular to a longitudinal direction, the longitudinal direction being coaxial with the punch and the anvil, and the sensor further comprises an optical or electrical sensor configured to send the sensed workpiece thickness characteristic to the controller before a joining cycle commences.

11. The apparatus of claim 9, further comprising a press ram linearly moving toward and away from the die due to actuation of the primary actuator, the adjuster being movable between the press ram and the punch, the adjuster having a smaller longitudinal thickness than a longitudinal length of the punch and a longitudinal length of the press ram, and the punch and the die being configured to join together metallic workpiece sheets through deformation.

12. The apparatus of claim 9, further comprising:

a stationary frame;

a guide block to which the punch is mounted, the guide block and the punch always moving together;

a linear carriage and rail assembly moveably coupling the guide block to the frame;

the adjuster being located between the punch and the primary actuator in at least one operating condition; and the punch being located between the adjuster and the die.

13. The apparatus of claim 9, further comprising a garage door stile and a garage door sheet metal panel, the punch and the die clinching the stile to turned edge flanges of the panel.

14. A workpiece-contacting apparatus comprising:

a workpiece-joining die including an anvil and upstanding die blades adjacent lateral sides of the anvil, the anvil having a workpiece-contacting surface;

an elongated workpiece-joining punch coaxially aligned with the die;

a fluid-powered actuator operably moving the punch from a retracted position to a workpiece-joining position; and a movable adjuster; and a secondary actuator moving the adjuster to vary a fully advanced distance between the workpiece-joining position of the punch and the workpiece-contacting surface of the die between joining cycles of the apparatus;

a sensor;

a programmable controller electrically connected to the sensor; and the controller being electrically connected to the secondary actuator to automatically control a position of the adjuster based at least in part on a sensed workpiece characteristic;

at least second and third punches, three of the punches being elongated parallel to each other, spaced apart from each other and co-planar;

at least second and third dies, three of the dies each including an anvil and die blades, three of the dies being spaced apart from each other and co-planar;

the adjuster operably changing a fully advanced distance between all of the punches and the dies; and the punches and the dies being configured to clinch together workpieces.

15. The apparatus of claim 14, wherein the sensed characteristic is a thickness of a workpiece.

16. The apparatus of claim 14, wherein the sensed characteristic is a type of material of a workpiece.

17. The apparatus of claim 14, wherein the adjuster has a smaller longitudinal thickness than a longitudinal length of the punch and a longitudinal length of a ram.

18. A workpiece-contacting apparatus comprising:

a die including a workpiece-contacting surface;

a punch coaxially aligned with the die;

a primary actuator operably moving the punch from a retracted position to a fully advanced position, the primary actuator including a fluid-powered piston; and a linearly moveable slide comprising at least one of:

(a) a first spacer extending from the slide a first height, and at least a second spacer extending from the slide a second height, the first height being greater than the second height, the spacers being laterally spaced away from each other such that only one of the spacers is aligned with the punch when the punch is advanced; or (b) a first portion of a tapered wedge extending from the slide with a first height and at least a second portion of the tapered wedge extending from the slide with a second height, the first height being greater than the second height; and a secondary actuator automatically moving the slide, along a plane between the primary actuator and the punch, to change a distance between the fully advanced position of the punch and the workpiece-contacting surface of the die.

19. The apparatus of claim 18, further comprising a press ram linearly moving toward and away from the die due to actuation of the primary actuator, the slide being physically movable between the press ram and the punch so as to vary a distance between the press ram and the punch temporally between advancing cycles of the punch, the slide having a smaller longitudinal thickness than a longitudinal length of the punch and a longitudinal length of the press ram, and the punch and the die being configured to join together work-piece sheets through deformation.

20. The apparatus of claim 18, further comprising:

a stationary frame;

a guide block to which the punch is mounted, the guide block and the punch always moving together;

a linear carriage and rail assembly moveably coupling the guide block to the frame;

the slide being located between the punch and the primary actuator in at least one operating condition; and the punch being located between the slide and the die in at least one operating condition.

21. The apparatus of claim 18, further comprising:

at least a second punch and at least a second die, all of the punches being elongated parallel to each other;

the slide operably changing a fully advanced distance between all of the punches and the dies at the same time; and the punches and the dies being configured to join together workpieces.

22. The apparatus of claim 18, further comprising:

a programmable controller electrically connected to the secondary actuator to automatically control a position of the slide due to workpiece thickness which, in turn, changes the fully advanced position of a workpiece-contacting end of the punch; and the punch and the die operably cycling at least 500 times per hour to clinch together or pierce workpieces in each cycle.

23. The apparatus of claim 18, wherein a thinner apex of the tapered wedge points toward a stationary frame to which the primary actuator and the die are mounted.

24. The apparatus of claim 18, further comprising a stationary frame to which the primary actuator and the die are mounted, and the slide moving toward and away from the frame.

25. The apparatus of claim 18, wherein the slide comprises the taper wedge which includes an infinitely adjustable tapered surface movable between the punch and the die to allow for infinitely changeable shut-height of the punch.

* * * * *